Aug. 10, 1954
R. W. KLING
2,686,079
SIDE DUMP TRAILER
Filed March 13, 1951
3 Sheets-Sheet 1
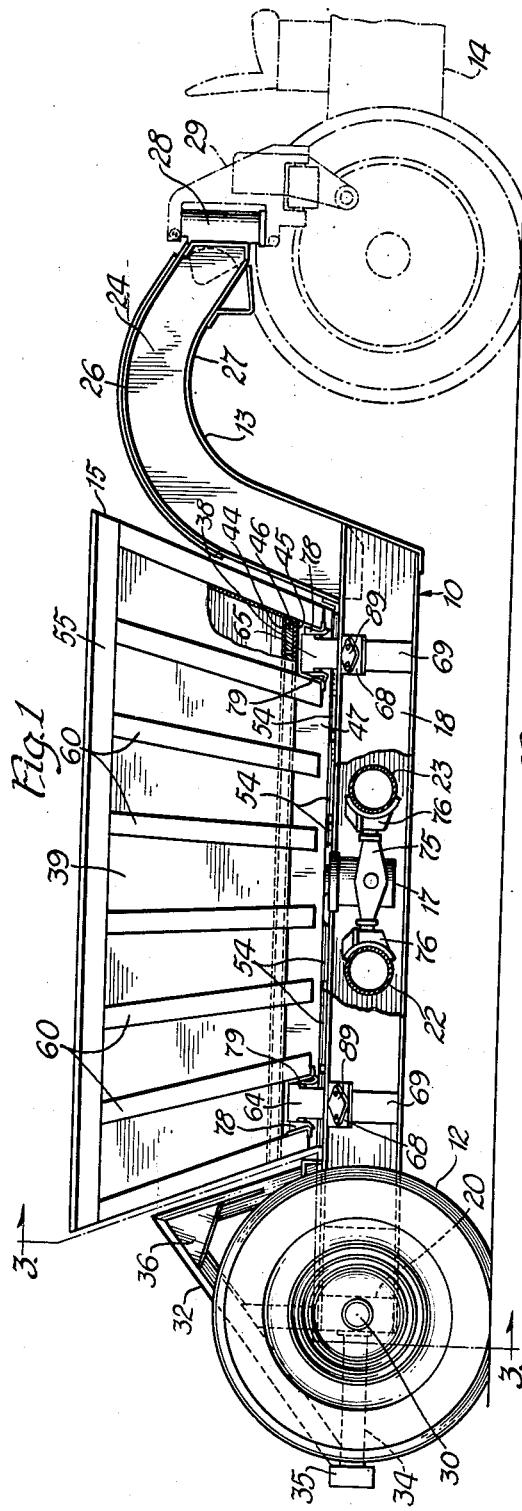
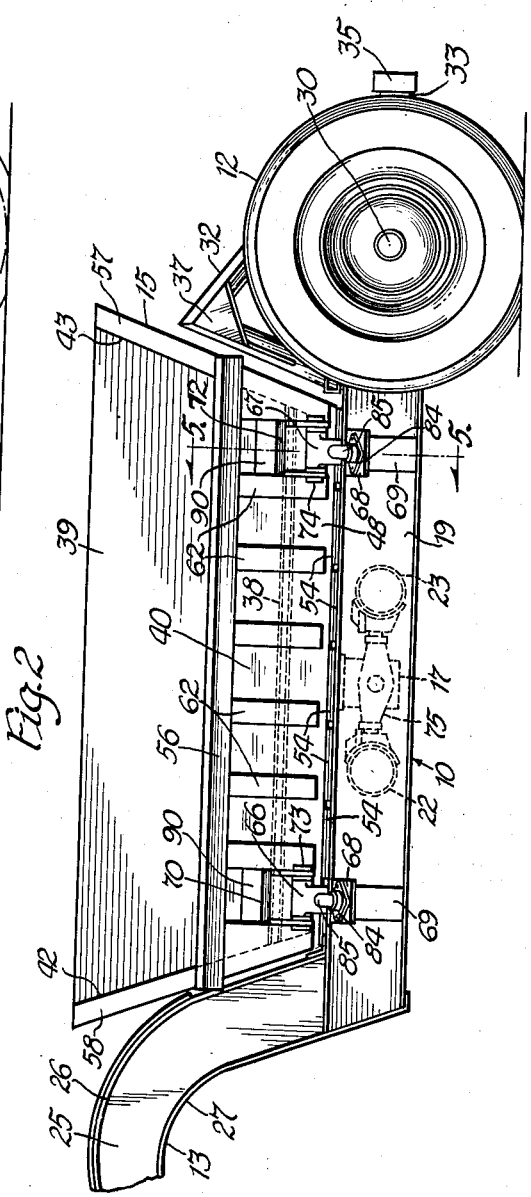
Inventor
Robert W. Kling
by Albert G. McCaleb
Atty.

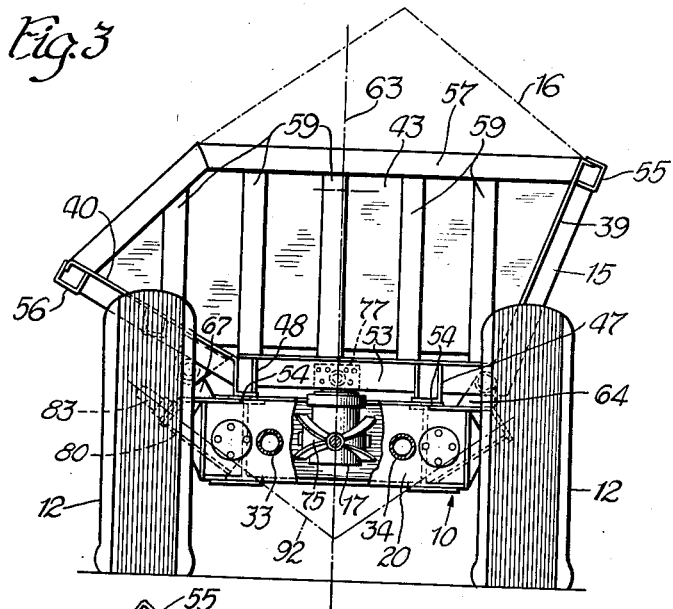
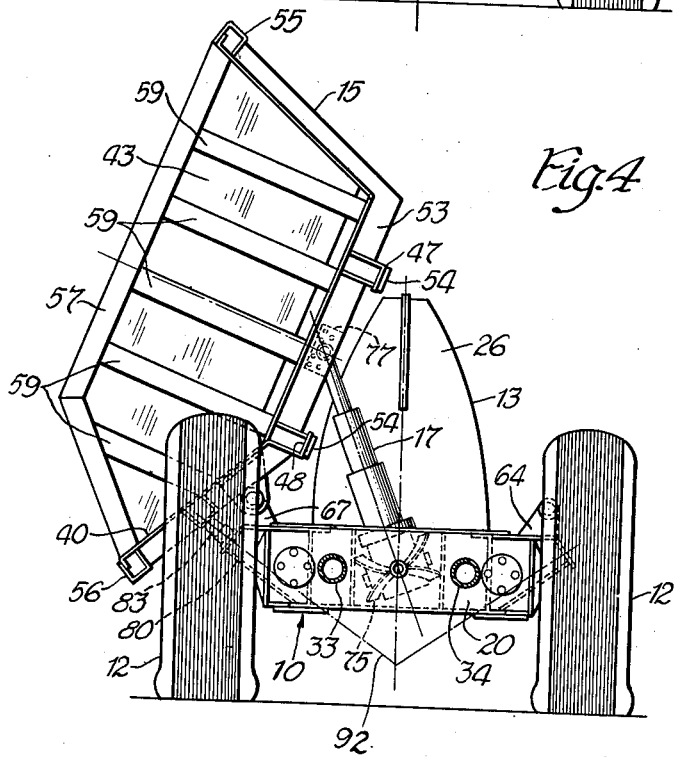

Aug. 10, 1954

R. W. KLING 2,686,079

SIDE DUMP TRAILER

Filed March 13, 1951

Inventor
Robert W. Kling
by Albert G. McCaleb
Atty.

Patented Aug. 10, 1954

2,686,079

UNITED STATES PATENT OFFICE 2,686,079

SIDE DUMP TRAILER

Robert W. Kling, Chicago, Ill., assignor to Athey Products Corporation, Chicago, Ill., a corporation of Illinois Application March 13, 1951, Serial No. 215,285

8 Claims. (Cl. 298—18)

This invention relates to trailers adapted to motivation by, and in conjunction with tractors for hauling loads, which trailers, in each instance, include a body hingedly mounted on a chassis for swinging movement laterally of the chassis to effect dumping of the load from the body.

One of the general objects of my invention is to provide structural features, arrangements and relationships in a trailer made for side dumping which afford lateral balance for both hauling and dumping, large load carrying capacity and the ability for selection of the side toward which the dumping is effected.

As a more specific object, my invention has within its purview the provision of a trailer body having a bottom and side and end walls in fixed relationship to one another, said side and end walls flaring outwardly toward the top to afford relief for material being dumped, and one of the side walls having a wider angle of slope with reference to the bottom than the other and selected to provide large load carrying capacity without spillage, as well as a downward discharge slope for dumping without the necessity of the body passing a position of reasonable stability relative to the chassis.

Another object of this invention is to provide a trailer body adapted to side dumping movement toward one side only of the body and relative to a chassis; said body being symmetrically constructed relative to a lateral plane, so as to be reversible upon the chassis for dumping to either side thereof.

My invention has for another object the provision of a side dump trailer including a body which is non-symmetrically constructed in reference to a central plane extending longitudinally thereof, so as to provide large load carrying capacity with one side disposed to facilitate side dumping, and in which trailer the body normally occupies a position such that the geometric center thereof is shifted toward one side of the supporting chassis, so as to effect a weight balance of the loaded body relative to the chassis.

It is another object of the invention to provide a side dump trailer structure wherein a load carrying body is tiltable laterally in reference to a chassis by an hydraulic hoist, and wherein resilient compression elements are utilized for checking the final stages of movement of the body toward its ultimate dumping position, so that it is necessary for the hoist to exert lifting force against the body to the end of the dumping movement, even though some material sticks to the body so as to have a tendency to shift the balance of the body toward its ultimate dumping position.

In correlation to the preceding object of my invention, it is a further object to provide a side dump trailer structure wherein resilient compression elements on the chassis are utilized to check the movement of the body toward its ultimate dumping position, and wherein the action lines of the compression elements are located and directed to give positive restraining force moments which counteract forces tending to upset the chassis during dumping of the body.

An additional object of my invention is to provide a side dump trailer embodying a chassis with hinge brackets on both sides thereof and a body having hinge elements on one side and guides on the opposite side aligned for coaction with the hinge brackets, said body being reversible relative to the chassis for dumping to either side, and said guides, as well as said hinge elements serving to prevent longitudinal shifting of the body relative to the chassis during normal hauling operations of the trailer.

Other objects and advantages of the invention will be apparent from the following description and the accompanying drawings in which similar characters of reference indicate similar parts throughout the several views.

Referring to the three sheets of drawings:

Fig. 1 is a side elevational view of a side dump trailer embodying a preferred form of my invention with portions broken away to show details of internal structure, and having its operative connection to a tractor illustrated fragmentarily in dot and dash lines;

Fig. 2 is a fragmentary side elevational view of the side of the trailer opposite that shown in Fig. 1;

Figs. 3 and 4 are rear end views taken substantially on a line 3—3 of Fig. 1 and illustrating two operating positions of the trailer parts;

Figure 5:
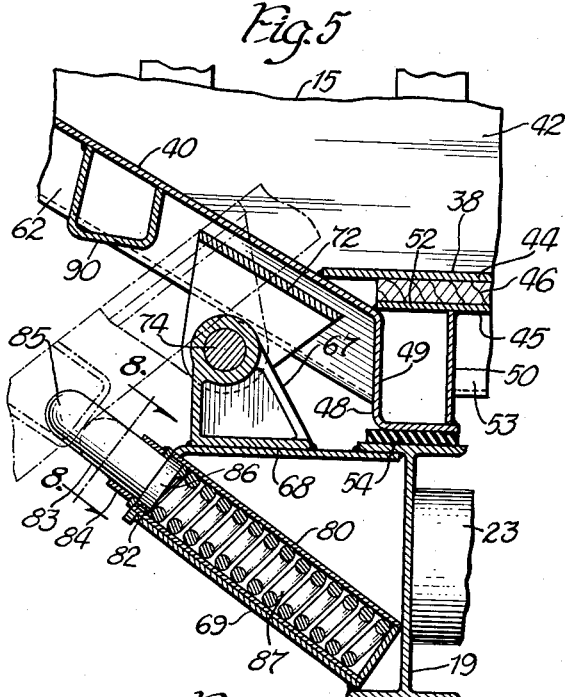
Fig. 5 is a fragmentary end sectional view taken substantially on a line 5—5 of Fig. 2 in the direction of the accompanying arrows and drawn to a larger scale than Fig. 2.
Figure 7:
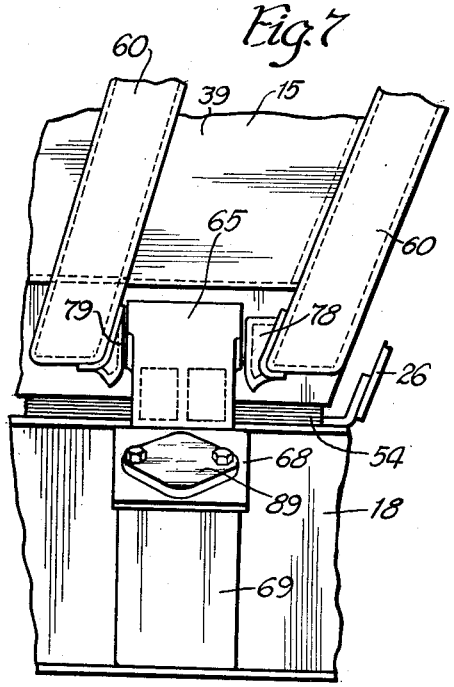
Fig. 7 is a fragmentary side elevational view of a portion of the structure shown in Fig. 1 and drawn to a larger scale.

Considered generally, the exemplary embodiment of my side dump trailer which is shown in the accompanying drawings for illustrative purposes includes a chassis 10 supported at its rear end by wheels 12 and having a goose-neck 13 at its front end which is adapted to provide a load supporting and towing connection to a tractor 14, as depicted in Fig. 1. The chassis 10 supports a body 15 between the wheels 12 and the goose-neck 13, which body is generally of the open top box type. As depicted in Fig. 3, the body 15 normally rests upon the chassis 10 for load carrying purposes and is adapted to carry a load which, in the instance of loose or relatively loose material, assumes a position such as that indicated at 16 in dot and dash lines. As will be more fully explained, the body 15 is hingedly connected to one side of the chassis and actuated by an hydraulic hoist 17 for lateral swinging movement to a side dumping position, as shown in Fig. 4.

Referring in greater detail to the structure of my side dump trailer, the chassis 10 embodies longitudinally extending side beams 18 and 19 in laterally spaced and substantially parallel relationship, which side beams are connected at their rear ends by a cross beam 20 and at their front ends by the goose-neck 13. Intermediate their ends and as shown in Figs. 1 and 2, the side beams are braced laterally by tubular cross members 22 and 23. The goose-neck 13 includes curved side plates 24 and 25 which converge forwardly and have formed top and bottom plates 26 and 27 secured thereto, as by welding, along their opposite edges. A bearing member 28 is secured to the forward end of the goose-neck 13 for making a towing and load supporting connection to the tractor 14 through means, such as a trailer stabilizing device 29, which stabilizing device is preferably provided to allow controlled lateral movement between the tractor and trailer during operation as in passing over uneven ground. The stabilizing device 29 indicated and outlined in Fig. 1 is of the type shown and described in my co-pending application Serial No. 258,073 filed November 24, 1951, and entitled "Stabilizing Hitch."

At the rear end of the chassis, supporting wheels 12 are mounted for rotation on the opposite ends of a rear axle 30. To provide some protection for the wheels and rear axle structure from falling rocks and other material during loading and hauling operations, a rear shield 32 is provided which extends across the rear end of the chassis between the wheels and slopes downwardly to the rear from a position adjacent the rear end of the body. At its forward end, the shield 32 is supported from the chassis, while at the rear end it is secured to tubular supports 33 and 34 which are secured and supported by the cross beam 20 and carry a rear bumper 35 at their outer ends. Formed side plates 36 and 37 are secured to the top portions of the opposite sides of the shield 32 and project outwardly over the wheels 12.

The body 15 has a bottom 38 from which side walls 39 and 40 and end walls 42 and 43 project upwardly. The bottom, side walls and end walls of my disclosed body structure are in fixed relationship to one another. As depicted in Figs. 1 and 5, the bottom 38 of the body comprises plates 44 and 45 in spaced and substantially parallel relationship with a filler 46 of boards therebetween to make it more resistant to impact and shock, as when materials such as rocks are dropped into the body during loading. Longitudinally, the bottom 38 of the body is supported and rigidified by side beams 47 and 48 of hollow box-like section which, in the present instance, are formed by shaped portions such as 49 of the lower margins of the respective side walls, together with longitudinally extending plates 50 and marginal portions 52 of the bottom plate 45 welded together by longitudinally extending seams, as illustrated in Fig. 5. Laterally, the bottom is rigidified by cross beams 53 which are also preferably hollow and fabricated of sheet metal welded to the bottom plate 45 and to the side beams 47 and 48. The side beams 47 and 48 of the body are aligned with the side beams 18 and 19 of the chassis and are normally supported therefrom through pads 54 of a resilient material, such as rubber.

The side walls 39 and 40 and the end walls 42 and 43 of the body are permanently secured to the bottom 38 in fixed relationship. One of the side walls which, in the present instance, is the side wall 39 and the end walls 42 and 43 diverge outwardly toward the top from vertical positions relative to the bottom, so as to provide relief for the flow of material from the body during dumping. The side wall 40 extends outwardly and upwardly from the bottom at an obtuse angle considerably wider than that between the bottom and the side wall 39; the side wall 40 being the dumping side or the one over which material passes when the body is tilted for dumping. The angular disposition and width of the side wall 40 are selected with reference to the heights of the end walls and the other side wall to provide maximum load carrying capacity without appreciable spillage of material at the sides or ends. That is, when loose material is put into the truck body to the extent that it reaches the tops of the sides and ends, it may be heaped, substantially as depicted in dot and dash lines at 16 in Fig. 3, and will be retained without appreciable spillage.

Another consideration determining the angular disposition of the side wall 40 relative to the bottom 38 is that the side wall 40 must slope downwardly when the body is tilted for dumping, as shown in Fig. 4; this downward slope of the side wall 40 being reached with reference to a selected axis of tilting movement before the body passes an unstable position with respect to the chassis when and even if some material clings to the body.

The structure of the side and end walls of my disclosed trailer body is preferably such that metal plates present smooth internal surfaces; the top margins of the side and end walls being reinforced by metal channels 55, 56, 57 and 58 secured to the outer surfaces thereof by welding. Also, the end walls are additionally rigidified by ribs such as 59 extending from top to bottom of the end walls at spaced positions and each comprising a metal channel secured to the outer surface of the end wall. Likewise, the side walls 39 and 40 are rigidified by ribs 60 and 62 respectively which extend from top to bottom of the outer surfaces of the side walls in spaced relationship, and each comprising a metal channel welded to the wall.

From the description of the body as thus far set forth, it may be readily understood that it is non-symmetrical with reference to a vertical plane extending longitudinally through the lateral geometric center of the body. Being non-symmetrical, it may also be understood that the center of gravity of the body when loaded does not coincide with the lateral geometric center of the body. As a matter of fact, and as viewed in Fig. 3, the center of gravity of the loaded body is approximately in a longitudinal plane indicated by a line 63, and is closer to the inside top edge of the upright side wall 39 than it is to the inside top edge of the side wall 40 over which material is dumped. Thus, to balance the normal load on the chassis, the geometric lateral center of the body is shifted toward the dumping side wall to a position such that a plane passing through the center of gravity of the loaded body coincides with the geometric longitudinal axis or center line of the chassis.

The body, thus being constructed and having a bottom, side and end walls in fixed relationship to one another and with one low side over which the material is dumped, is adapted to dumping on only one side. Usually, for a given job or at a particular location, dumping toward one side is sufficient. However, to adapt the disclosed body to dumping on either side of the chassis, I have made the body and its structural mounting and operating parts symmetrical with respect to a vertical plane passing laterally through the longitudinal center of the body. With this arrangement, the body is adapted to end-to-end reversal, whereby the side of the chassis toward which the body is dumped may be selected. With such reversal of the body in mind, I have provided hinge brackets 64 and 65 at longitudinally spaced positions on one side of the chassis and hinge brackets 66 and 67 on the other side of the chassis in opposed positions equally spaced from the lateral central plane of the mounted body.

Figure 6:
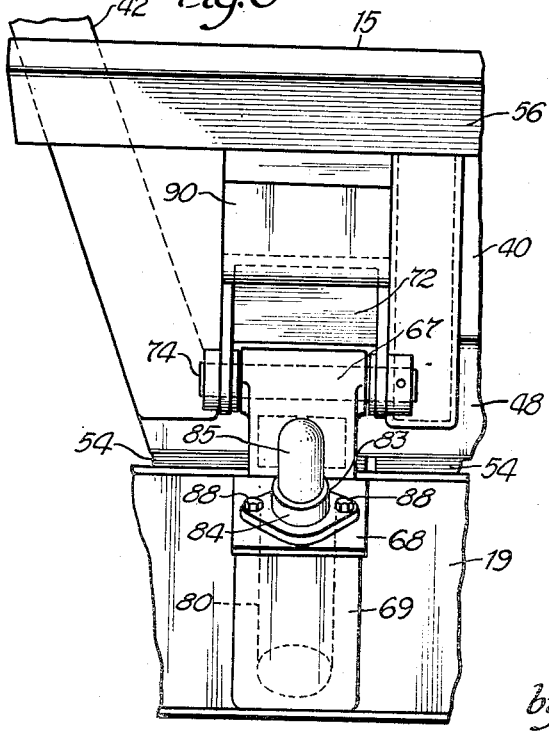
Fig. 6 is a fragmentary side elevational view showing a portion of the structure illustrated in Fig. 2 and drawn to a larger scale.
Figure 8:
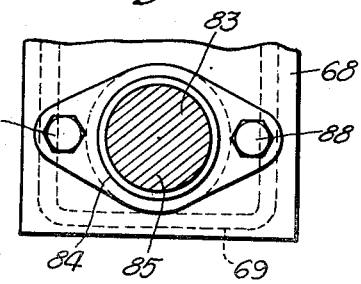
Fig. 8 is a fragmentary sectional view taken substantially on a line 8—8 of Fig. 5 and in the direction indicated by accompanying arrows.

As depicted in Figs. 5 and 6, each of the hinge brackets 64, 65, 66 and 67 is secured to a plate 68, which plate is in turn secured to and projects outwardly from one of the side beams of the chassis. Each of the plates 68 is bent downwardly at an obtuse angle at its outer end and has a brace plate 69 secured thereto and extending inwardly and downwardly with its lower end secured to the lower portion of the adjacent side beam of the chassis. As shown in Figs. 2, 5 and 6, substantially U-shaped hinge elements 70 and 72 are secured to the outer surface of the side wall 40 of the body at positions such that each straddles one of the hinge brackets when the body is in its normal position relative to the chassis. Removable hinge pins 73 and 74 movably connect the hinge elements 70 and 72 to their respective hinge brackets 66 and 67, and provide an axis for the lateral swinging movement of the body relative to the chassis between normal and dumping positions depicted in Figs. 3 and 4 respectively. When the body is reversed relative to the chassis, the hinge elements are connected to the opposed hinge brackets for similar tilting movements of the body on the opposite side of the chassis.

For raising the body to its dumping position relative to the chassis, I have provided the hydraulic hoist 17 carried by and between cross members 22 and 23 on the chassis by a yoke member 75 which is supported for lateral swinging movement relative to bearing brackets 76 on the cross members 22 and 23. The hoist is centrally disposed with reference to the mounted body, so that in either position of the body, the movable end of the hoist is connected to a connecting plate 77.

On the outer surface of the side wall 39 of the body opposite the hinge elements 70 and 72, guides 78 and 79 are secured thereto in positions adjacent the opposite ends of the hinge brackets which are not being utilized for hingedly supporting the body for its tilting movements. These guides not only serve in effecting proper alignment of the body relative to the chassis when it is returned to its normal position after being dumped, but also serve as stops for preventing longitudinal shifting movement of the body relative to the chassis during hauling operations.

The downwardly projecting end portion of each of the hinge bracket mounting plates 68 on the chassis is provided with an opening 82, which opening is adapted to receive a tubular housing 80 of a spring urged plunger assembly 83, as shown in Figs. 5 and 6; such tubular housing being of a length such that the inner end thereof rests against the surface of one of the chassis side beams. At its outer end, the tubular housing has a flanged collar 84 secured thereto which serves as a guide for linear movement of a plunger 85 axially of the tubular housing. At its inner end, each plunger has a flange 86 which abuts the flanged collar 84 to restrict the outward movement thereof. A coil type compression spring 87 is mounted within each of the tubular housings to bias the plunger to an extended position.

In the disclosed structure, the flanged collars 84 are secured to their respective plates 68 by fastening means such as cap screws 88. While such spring urged plunger assemblies could be permanently mounted at each of the hinge brackets on the chassis, I prefer to utilize only two such assemblies for purposes of economy, and to cover the openings 82 in the other plates by a cover plate 89. The spring urged plunger assemblies are utilized on the side of the chassis toward which the body is dumped. Metal striker elements 90 are secured to the outer surface of the side wall 40 at positions for engagement with the ends of the spring urged plungers 85, and have end surfaces which are practically normal to the line of movement of the plungers. The linearly movable plungers 85 of these spring urged plunger assemblies engage the striker elements 90 on the side of the body as the body approaches its final dumping position. They check the final movement of the body toward its dumping position. They also cause the hoist 17 to exert lifting force, even though material sticks to the interior of the body. Additionally, they provide a force tending to effect movement of the body from its dumping position back to its normal position.

The action lines of the spring urged plunger assemblies which, in the present instance, coincide with the axes of the coiled compression springs 87, are disposed and directed to introduce force elements or moments promoting the stability of the trailer when the body is dumped. That is, these force elements or moments are directed so as to have a definite and appreciable tendency to prevent the chassis from being tipped to the dumping side during dumping, and particularly in the instance in which sticky material clings to the trailer body. As indicated in Figs. 3 and 4, the action lines of the spring plunger assemblies 83 are indicated by lines 92. It may be observed that these lines 92 cross the longitudinal central plane of the chassis substantially above the ground level and within the triangle defining the lines of stability of the depicted vehicle which has three point suspension, so that the moments of force resulting from the pressure of the body against the spring plunger assemblies are clockwise about the line of stability, as viewed in Fig. 4, so as to counteract the counterclockwise moments about the line of stability and resulting from the body weight and weight of material therein, thereby stabilizing the chassis.

Another factor influencing the stability of the trailer while it is being dumped is the location of the axis of the hinge pins, about which the body is tilted. In the disclosed structure, the hinge axis is located below the dumping side wall 40, so that a downward discharge slope of the dumping side is reached before the center of gravity of the body plus a relatively small portion of a load will pass the hinge axis during its movement toward the ultimate dumping position.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a side dump trailer structure, the combination comprising a chassis, an open top box-type body mounted on the chassis for lateral tilting movement about a fixed axis and relative to the chassis, and resilient means normally disengaged from the body and secured to the side of the chassis for engagement with the body during said tilting movement of the body for checking and limiting the tilting movement of the body, said resilient means having an action line extending downwardly and across a longitudinal central plane of the chassis from the side of said plane on which they are mounted.

2. A side dump trailer adapted to use in connection with a tractor and comprising, in combination, a chassis having wheels at the rear end and a goose-neck at the front end for support by and attachment to a tractor, a body mounted on the chassis between the wheels and the goose-neck, hinge brackets secured to both sides of the chassis in spaced relationship longitudinally thereof, hinge elements secured to one side of the body and connected by hinge pins to the hinge brackets, whereby said body is tiltable for dumping toward said one side of the chassis, and an hydraulic hoist movably mounted on the chassis at the lateral center line thereof for effecting tilting movement of the body relative to the chassis, said body having a bottom and side and end walls in fixed relationship to one another, the structure and sectional contours of the body being such that it is non-symmetrical with reference to a longitudinal central plane and substantially symmetrical with reference to a lateral central plane, said body being mounted on the chassis at a lateral position such that the longitudinal central plane of the body is displaced from the lateral center of the chassis in a direction toward said one side of the body, and spring urged plungers secured to the chassis on the same side thereof as the hinge elements, said plungers being disposed for engagement with the side of the body after the dumping movement of the body has started to check the movement thereof toward the ultimate dumping position relative to the chassis.

3. A side dump trailer adapted to use in connection with a tractor and comprising, in combination, a chassis having wheels at the rear end and a goose-neck at the front end for support by and attachment to a tractor, a body mounted on the chassis between the wheels and the goose-neck, hinge brackets secured to both sides of the chassis in spaced relationship longitudinally thereof, hinge elements secured to one side of the body and connected by hinge pins to the hinge brackets, whereby said body is tiltable for dumping toward said one side of the chassis, and an hydraulic hoist movably mounted on the chassis at the lateral center line thereof for effecting tilting movement of the body relative to the chassis, said body having a bottom and side and end walls in fixed relationship to one another, the structure and sectional contours of the body being such that it is non-symmetrical with reference to a longitudinal central plane and substantially symmetrical with reference to a lateral central plane, said body being mounted on the chassis at a lateral position such that the longitudinal central plane of the body is displaced from the lateral center of the chassis in a direction toward said one side of the body, spring means mounted on the chassis on the side thereof adjacent the hinge elements, said spring means being positioned for engagement with the body to check the final portion of the dumping movement thereof, and the action lines of the spring means being directed to cross the longitudinal central plane of the chassis, so that the force moments of the spring means tend to resist the forces of the body tending to upset the chassis laterally during dumping of the body.

4. In a side dump trailer structure, the combination comprising a chassis, an open top box-type body mounted on the chassis, hinge brackets secured to one side of the chassis in spaced relationship longitudinally of the chassis, hinge elements secured to the side of the body adjacent the hinge brackets, said hinge brackets and hinge elements being movably connected to provide for lateral tilting movement of the body relative to the chassis, means for tilting the body relative to the chassis, said body having a bottom with side and end walls in fixed relationship thereto, the lateral section of said body being substantially uniform throughout practically the entire length thereof and being non-symmetrical with reference to a vertical central plane by virtue of having a dumping side wall which extends outwardly from the bottom at a wider angle than that of the opposite side wall, the geometric center of the body being offset from the lateral center of the chassis to effect a balance of the load on the chassis, spring means for checking the lateral tilting movement of the body relative to the chassis, and the action line of said spring means being directed to oppose the tendency of the tilted body to upset the chassis.

5. In a side dump trailer structure, the combination comprising a chassis, an open top box-type body mounted on the chassis, said body having a bottom with side and end walls in fixed relationship thereto, hinge means on one side of the chassis for connecting the body to the chassis for lateral tilting movements between normal and dumping positions, the end walls and one of the side walls extending upwardly from the bottom to corresponding heights, and the other of the side walls being on the side of the body adjacent the hinge means and sloping outwardly and upwardly from the bottom to a height less than that of the other side and at an angle relative to the bottom which is materially larger than that between the bottom and said one of the side walls, the angle of slope between the bottom and said other of the sides being selected to retain material without substantial spillage when the body is in its normal position and being so related to the axis of the hinge means that it slopes downwardly for dumping purposes when the body is in the dumping position, spring urged plungers projecting upwardly and outwardly from the sides of the chassis adjacent the hinge means, and striker elements secured to the outer surface of said other of the side walls at positions for engagement with the plungers when the body approaches the dumping position.

6. A side dump trailer for use in connection with a tractor and having a normally established dumping side which is adapted to change from side to side of the trailer by reversal of the body relative to the chassis, said trailer comprising, in combination, a chassis having wheels at the rear end and a gooseneck at the front end for attachment to and support by a tractor, a body mounted on the chassis between the wheels and the gooseneck, hinge brackets secured at like positions and in spaced relationship to both sides of the chassis, hinge elements secured to one side of the body at positions for movable connection to the hinge brackets on the adjacent side of the chassis, means for providing movable connections between the hinge elements and adjacent hinge brackets, whereby said body is tiltable for dumping toward said one side thereof, an hydraulic hoist movably mounted on the chassis at the lateral geometric center line thereof and releasably connected to the body for effecting tilting movement of the body relative to the chassis, said body having a bottom and a side wall and end walls in fixed relationship to one another, said side wall and the major portions of the end walls being of substantially equal height and the remaining portions of the end walls sloping outwardly and downwardly to the top of another side wall so that the body is non-symmetrical with reference to a geometric longitudinal central plane and substantially symmetrical with respect to a lateral geometric central plane, and said body being mounted on the chassis at a lateral position such that the geometric longitudinal central plane of the body is displaced from the geometric lateral center line of the chassis in a direction toward said one side of the body so as to effect substantial balance of the weight of the loaded body laterally of the chassis.

7. A side dump trailer as defined in claim 6, and wherein the end walls and one side wall flare outwardly somewhat from the vertical toward the top, and the other side wall having a relatively wide angle with reference to the base to provide large load carrying capacity, and the angle of said other side with reference to the bottom being such that it provides downward slope for dumping while the body is in a position with reference to the hinge brackets from which it will return by gravity to the chassis after being dumped.

8. In a side dump trailer structure, the combination comprising a chassis of predetermined width, an open top box-type body mounted on the chassis, hinge brackets secured to one side of the chassis in spaced relationship longitudinally of the chassis, hinge elements secured to the side of the body adjacent the hinge brackets, said hinge brackets and hinge elements being movably connected to provide for lateral tilting movement of the body relative to the chassis, means for tilting the body realtive to the chassis, said body having a bottom with a side and end walls in fixed relationship to the bottom and presenting top edges of substantially equal height above the bottom and which extend along one side and across the major portion of the width of the chassis, the lateral section of said body being substantially uniform throughout practically the entire length thereof and being non-symmetrical with reference to a vertical geometric central plane by virtue of having a dumping side wall which extends outwardly and upwardly from the bottom at a wider angle than that of the opposite side wall, said dumping side wall having a top edge below the top edge of the first mentioned side wall and said end walls having top edge portions sloping downwardly to the level of said dumping side, the geometric central plane of the body being offset from the lateral geometric center line of the chassis to effect a balance of the loaded body on the chassis.

References Cited in the file of this patent

UNITED STATES PATENTS

| Number | Name | Date |
|---|---|---|
| 1,609,807 | Fraunfelder | Dec. 7, 1926 |
| 1,909,969 | Kuchar | May 23, 1933 |
| 2,047,051 | Armington et al. | July 7, 1936 |
| 2,160,789 | Severinghaus | May 30, 1939 |
| 2,194,068 | Eisenberg, Jr. | Mar. 19, 1940 |
| 2,513,658 | MacDonald | July 4, 1950 |
| 2,523,035 | MacDonald | Sept. 19, 1950 |
| 2,530,613 | Hopper | Nov. 21, 1950 |